United States Patent
Temple et al.

(10) Patent No.: US 10,144,407 B2
(45) Date of Patent: Dec. 4, 2018

(54) SYSTEM AND METHOD FOR CONTROLLING CONFIGURATION OF VEHICLE POWER STEERING BASED ON DRIVELINE OPERATION

(71) Applicant: Jaguar Land Rover Limited, Whitley, Coventry, Warwickshire (GB)

(72) Inventors: Nick Temple, Coventry (GB); Craig Edwards, Bicester (GB); John Kewley, Leamington Spa (GB); Anthony Whittle, Nuneaton (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 47 days.

(21) Appl. No.: 15/021,135

(22) PCT Filed: Sep. 10, 2014

(86) PCT No.: PCT/EP2014/069268
§ 371 (c)(1),
(2) Date: Mar. 10, 2016

(87) PCT Pub. No.: WO2015/036424
PCT Pub. Date: Mar. 19, 2015

(65) Prior Publication Data
US 2016/0221565 A1    Aug. 4, 2016

(30) Foreign Application Priority Data
Sep. 10, 2013    (GB) .................................. 1316061.9

(51) Int. Cl.
*B62D 5/04* (2006.01)
*B60W 10/119* (2012.01)
(Continued)

(52) U.S. Cl.
CPC .......... *B60W 10/119* (2013.01); *B60W 10/20* (2013.01); *B62D 5/0457* (2013.01);
(Continued)

(58) Field of Classification Search
CPC ....... B60W 10/119; B60W 10/20; B62D 6/00; B62D 6/007; B62D 5/0457
(Continued)

(56) References Cited

U.S. PATENT DOCUMENTS

| | | | |
|---|---|---|---|
| 8,020,660 | B2 | 9/2011 | Kurata et al. |
| 8,571,759 | B2 | 10/2013 | Oblizajek et al. |

(Continued)

FOREIGN PATENT DOCUMENTS

| | | |
|---|---|---|
| CN | 1919678 A | 2/2007 |
| CN | 102180194 A | 9/2011 |

(Continued)

OTHER PUBLICATIONS

Machine Translation: Kawamoto et al., JP 2009292286 A, Dec. 17, 2009, Japanese Patent Publication.*

(Continued)

*Primary Examiner* — Nadeem Odeh
(74) *Attorney, Agent, or Firm* — Reising Ethington P.C.

(57) ABSTRACT

A method and system of controlling a configuration of a vehicle power-assisted steering (PAS) system is provided. The method includes detecting at a vehicle a change between two-wheel-drive driveline operation and four-wheel-drive driveline operation; accessing a pre-defined PAS profile stored at the vehicle based on the detected change; and operating the vehicle PAS system using at least one variable included in the PAS profile in response to the detected change in driveline operation.

8 Claims, 4 Drawing Sheets

(51) Int. Cl.
  *B62D 6/00* (2006.01)
  *B60W 10/20* (2006.01)
(52) U.S. Cl.
  CPC ............... *B62D 6/00* (2013.01); *B62D 6/007* (2013.01); *B60W 2520/403* (2013.01)
(58) Field of Classification Search
  USPC .......................................................... 701/41
  See application file for complete search history.

(56) References Cited

U.S. PATENT DOCUMENTS

| | | | |
|---|---|---|---|
| 8,701,820 | B2 | 4/2014 | Gagnon et al. |
| 8,930,078 | B2 | 1/2015 | Nishimori |
| 9,221,493 | B2 | 12/2015 | Nishimori |
| 2005/0224277 | A1* | 10/2005 | Kato ..................... B60W 10/10 180/422 |
| 2008/0015752 | A1 | 1/2008 | Riepold et al. |
| 2011/0048840 | A1 | 3/2011 | Gagnon et al. |
| 2013/0190986 | A1 | 7/2013 | Nishimori |

FOREIGN PATENT DOCUMENTS

| | | |
|---|---|---|
| CN | 102897213 A | 1/2013 |
| CN | 103223973 A | 7/2013 |
| DE | 102013201207 A1 | 7/2013 |
| FR | 2853295 A1 | 10/2004 |
| JP | S63116982 A | 5/1988 |
| JP | H0558317 A | 3/1993 |
| JP | H06263050 A | 9/1994 |
| JP | 2009292286 | 12/2009 |
| JP | 2009292286 A | 12/2009 |
| JP | 2013151207 A | 8/2013 |
| WO | 2009096998 A1 | 8/2009 |

OTHER PUBLICATIONS

Chinese Office Action in Chinese with English translation for CN application No. 201480049736.6, dated Feb. 4, 2017, 20 pages.
Japanese Office Action in Japanese with English summary for JP application No. 2016-539591, dated Mar. 14, 2017, 5 pages.
Combined Search and Examination Report corresponding to application No. GB1316061.9, dated Apr. 22, 2014, 6 pages.
International Search Report corresponding to International application No. PCT/EP2014/069268, dated Nov. 27, 2014, 4 pages.
Written Opinion corresponding to International application No. PCT/EP2014/069268, dated Nov. 27, 2014, 7 pages.
Combined Search and Examination Report corresponding to application No. GB1415967.7, dated Mar. 6, 2015, 7 pages.
Japanese Office Action in Japanese with English summary for JP application No. 2017-197485, dated Jul. 17, 2018, 7 pages.

* cited by examiner

SYSTEM AND METHOD FOR CONTROLLING CONFIGURATION OF VEHICLE POWER STEERING BASED ON DRIVELINE OPERATION

TECHNICAL FIELD

The present disclosure relates generally to vehicle operation, and more particularly, to a system and method controlling the configuration and/or operation of a vehicle power-assisted-steering (PAS) system based on the selectable aspects of vehicle driveline operation.

BACKGROUND

Modern vehicles commonly include PAS systems that reduce the effort needed to operate the steering wheel of the vehicle. Without the assistance of PAS systems, the force required to rotate the steering wheel of a vehicle could be quite high—enough to make steering uncomfortable for both smaller and larger drivers. Using hydraulic, electric, or electro-hydraulic mechanisms, the PAS systems can augment steering effort to such an extent that drivers both small and large can comfortably operate the steering wheel of a vehicle.

However, the amount of assistance provided by the PAS system may not always be optimal. On one hand, PAS systems should provide enough assistance so that the driver does not exert undue effort turning the steering wheel. On the other hand, too much assistance can result in a steering feel at the steering wheel that is isolated and lacking feedback from the road surface under the tyres. Such a balance could be managed more accurately in vehicles that did not stray from paved road surfaces and/or solely powered two wheels rather than optionally powering four. When a vehicle driveline powers two wheels (e.g., operates in two-wheel drive mode) the steering effort and characteristics are different than when the vehicle driveline powers four wheels (e.g., operates in four-wheel drive mode). That is, a PAS system that is tuned to operate satisfactorily under a four-wheel drive mode of operation may provide more assistance that would be optimal when the vehicle operated in a two-wheel-drive mode of operation.

Accordingly, there is a need for a system and a method for use with the same that minimizes and/or eliminates one or more of the above-identified deficiencies.

SUMMARY

According to an embodiment, there is provided a method of controlling a configuration of a vehicle power-assisted steering (PAS) system. The method includes detecting a change between two-wheel-drive driveline operation and four-wheel-drive driveline operation in a vehicle; accessing a pre-defined PAS profile stored at the vehicle based on the detected change; and operating the vehicle PAS system using at least one variable included in the PAS profile in response to the detected change in driveline operation.

According to another embodiment, there is provided a method of controlling a configuration of a vehicle power-assisted-steering (PAS) system. The method includes detecting a change between two-wheel-drive driveline operation and four-wheel-drive driveline operation in a vehicle; accessing a pre-defined PAS profile stored at the vehicle based on the detected change; selecting one or more variables to apply to the PAS system from the pre-defined PAS profile, wherein the variables include a level of PAS assist, a level of PAS damping, or a level of steering wheel return; and instructing PAS system to change one of the selected variables and apply data associated with the selected variable stored in the PAS profile.

According to yet another embodiment, a vehicle power-assisted steering system (PAS) controller comprises an electronic vehicle control unit (VCU) that includes a processor, a non-transient computer-readable medium for storing data, and a communication input for receiving an indicator that alerts the VCU of a change between two-wheel-drive driveline operation and four-wheel-drive driveline operation, wherein the VCU: detects a change between two-wheel-drive driveline operation and four-wheel-drive driveline operation using the communication input; accesses a pre-defined PAS profile stored in the non-transient computer-readable medium; and commands a vehicle PAS system to change at least one variable included with the PAS profile in response to the detected change in driveline operation.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the following figures in which.

DETAILED DESCRIPTION

Figure 1:
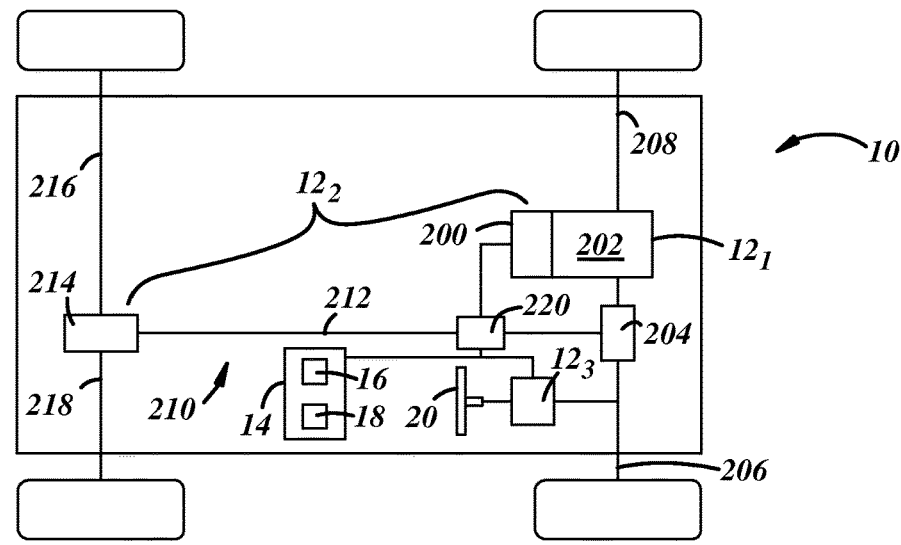
FIG. 1 is a schematic and block diagram of a vehicle.

The system and method described herein controls one or more variables of a vehicle power assisted steering (PAS) system based on whether the driveline of the vehicle is in a four-wheel-drive or two-wheel-drive operating mode. As discussed above, the PAS of a vehicle can be optimized for a vehicle that is powered by two wheels or optimized for a vehicle that is powered by four wheels. But it can be helpful to establish a pre-defined PAS profile for two-wheel-drive operation and a separate pre-defined PAS profile for four-wheel-drive operation. A means for directing PAS operation, such as a vehicle control unit (VCU) in communication with a vehicle bus, can receive a signal that indicates when the vehicle driveline changes between two-wheel-drive operation and four-wheel-drive operation. When such a signal is received, the VCU can then select a pre-defined PAS profile that defines PAS system variables and direct the PAS system to begin using those variables. PAS system variables can include various aspects of vehicle steering performance, such as a level or amount of assistance that the PAS system provides, a level or amount of damping the PAS system provides, and/or a level or amount of assistance the PAS system provides to return the vehicle steering wheel to its center position. In one example of how these variables can be tuned or changed to affect performance of the PAS system, it can be appreciated that when the vehicle operates in two-wheel-drive mode, the amount of effort needed to turn the wheels is less than when the vehicle operates in four-wheel-drive mode. Thus, the level or amount of assist that is optimal for the PAS system to provide is less than when the vehicle operates in four-wheel-drive mode. Similarly, two-wheel-drive mode can render the steering of a vehicle less needing of an amount or level of steering damping and also result in a steering wheel that returns to center position sooner and with less assistant force than when the vehicle operates in four-wheel-drive mode. When in four-wheel-drive mode, it can be optimal for the PAS system to provide a higher level of assist, greater levels of damping, and greater levels of assistance returning the steering wheel to center relative to when the vehicle is in two-wheel-drive mode.

The PAS system can also optimize the amount of steering wheel assistance provided during a transitional period that occurs when the driveline of the vehicle shifts between a two-wheel-drive mode and a four-wheel-drive mode without driver input or direction. As the vehicle travels, its tyres contact a road surface or ground surface that may vary significantly. For example, the road/ground surface may have varying coefficients of friction or different grades and contours. The vehicle can analyze how effectively the tyres of the vehicle contact the road or ground surface and automatically switch between two-wheel-drive mode and four-wheel-drive mode based on the amount of contact the tyres are able to make or other vehicle stability measurements. In one example, the vehicle may be configured to operate in a two-wheel-drive mode while travelling over a paved road surface. When the vehicle detects an amount of tyre slippage that is above a predetermined threshold, the vehicle can respond by shifting the driveline from two-wheel-drive mode to four-wheel-drive mode. The detection and shifting between two-wheel-drive and four-wheel-drive can occur relatively quickly (~100 milliseconds).

When the resulting change between two-wheel-drive mode and a four-wheel-drive mode occurs automatically, a change in drive torque applied to the front wheels of the vehicle can change the return force opposing movement of the steering wheel. A vehicle travelling in a straight line creates a return force in both front wheels. On a flat road with ideal wheels and tyres, the return force is equal at both of the front wheels. That is, to turn the steering wheel, the driver encounters the same amount of resistance or torque when rotating the wheel and the resistance/torque is equal regardless of which direction the steering wheel is moved with respect to a center position. The symmetry of the return force can be affected by a number of variables, such as tyre condition, tyre pressures, suspension geometry alignment, road friction asymmetry, and forces generated during cornering. The magnitude of the return force can be affected by variables such as tyre type, tyre condition, tyre pressure, suspension geometry, road surface friction, and whether the vehicle is accelerating of braking. In one example in which the vehicle is in a four-wheel-drive mode, drive torque acting on the front wheels may pre-load the bushings of the vehicle suspension thereby changing the way the vehicle suspension reacts to changes in road surface contour or texture. The load applied to the bushings also may change based on the acceleration or braking of the vehicle. The interaction between the vehicle suspension and the road changes can alter then aligning or resisting force felt at the steering wheel of the vehicle.

The driver may not expect a change in the steering effort to overcome the return force and/or feel that may accompany the automatic change or shift between two-wheel drive mode and four-wheel-drive mode. For example, the automatic change or shift between two-wheel drive mode and four-wheel-drive mode can be accompanied with an increase in the reactive force for moving the steering wheel. The PAS system can engage at the detection of wheel slippage and/or driveline shifts to compensate for the added or reduced steering effort during the transitional period that results from the automatic driveline shifts. As a result, the driver can experience a more uniform steering feel during driveline shifts between two-wheel-drive mode and a four-wheel-drive mode.

The PAS system can use a plurality of pre-defined PAS profiles that each use one or more PAS system variables. For instance, the PAS system can use a four-wheel-drive PAS profile as well as a two-wheel-drive profile. And each of the PAS profiles can use any one of the following variables alone or in various combinations: a level or amount of assistance that the PAS system provides, a level or amount of damping the PAS system provides, and/or a level or amount of assistance the PAS system provides to return the vehicle steering wheel to its center position. When the vehicle switches from two to four-wheel-drive modes or from four to two-wheel-drive modes, the PAS system can detect this and apply optimized PAS system variables included in PAS profiles for each mode. One aspect of the method/system described herein involves a vehicle that provides a relatively constant amount of steering effort regardless of whether the vehicle is operating in two-wheel-drive mode or four-wheel-drive mode. Put differently, this can be implemented by using different PAS profiles that make the steering heavier in two-wheel-drive mode (decreasing the amount of assist, decreasing the amount of dampening, and decreasing amount of assistance for returning the steering wheel to center) and makes the steering lighter in four-wheel-drive mode (increasing the amount of assist, increasing the amount of dampening, and increasing the amount of assistance for returning the steering wheel to center). However, it should be appreciated that these PAS profiles are only examples of how PAS system variables can be used and are relative levels that can be changed depending on any particular vehicle application. In addition to two and four-wheel drive mode distinctions, the PAS profiles can also include more detailed tuning of the PAS system variables based on the speed of the vehicle. This will be described in more detail below.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present disclosure.

With reference to FIG. 1, there are shown some of the components of a vehicle 10, with which the present method and system may be used. Although the following description is provided in the context of the particular vehicle 10 illustrated in FIG. 1, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, and a vehicle control unit 14 (VCU 14), among any number of other components, systems, and/or devices not illustrated or otherwise described herein.

Figure 2:
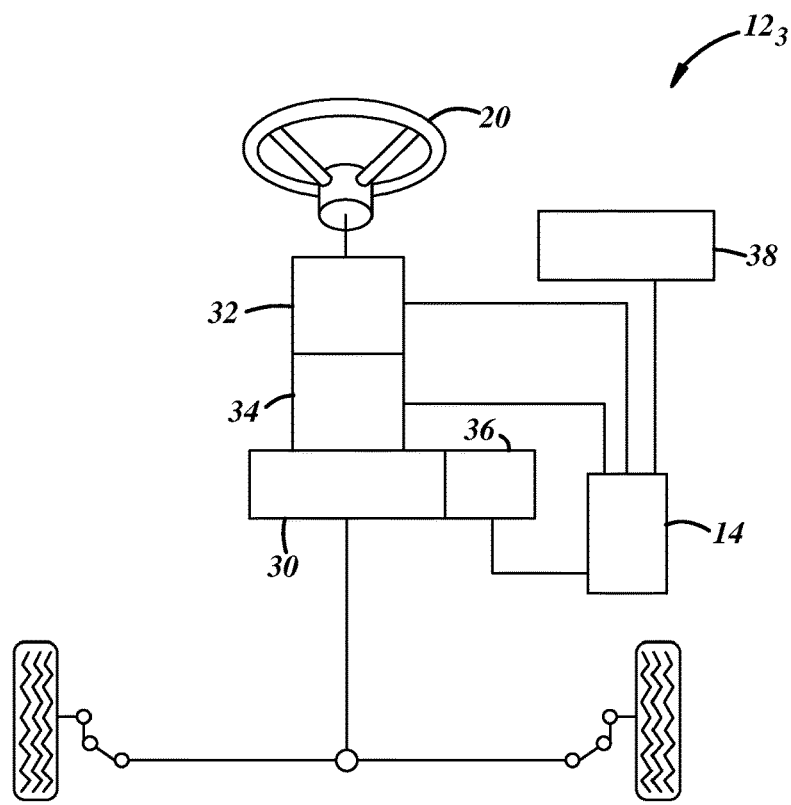
FIG. 2 is another block diagram of the vehicle illustrated in FIG. 1.

Subsystems 12 of vehicle 10 may be configured to perform or control various functions and operations relating to the vehicle and, as illustrated in FIG. 2, may include any number of subsystems. One such subsystem is a powertrain subsystem $12_1$. As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. Accordingly, the present disclosure is not limited to any one particular powertrain subsystem.

Yet another example of subsystem of vehicle 10 is a driveline subsystem $12_2$. As is known in the art, and as is illustrated in FIG. 1, driveline subsystem $12_2$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts 206, 208. In the illustrated embodiment, driveline subsystem $12_2$ also comprises an auxiliary driveline portion 210 arranged to drive the rear wheels of vehicle 10 by means of an auxiliary driveshaft or prop-shaft 212, a rear differential 214, and a pair of rear drive shafts 216, 218. In various embodiments, driveline subsystem $12_2$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 210 by means of a transfer case or power transfer unit 220, allowing selectable two wheel drive or four wheel drive modes of operation. In certain instances, and as is well known in the art, transfer case 220 may be configured to operate in either a high range (HI) or low range (LO) gear ratio, which may be adjustable by driveline subsystem $12_2$ itself and/or by another component of vehicle 10, such as, for example, VCU 14. Those having ordinary skill in the art will appreciate that driveline subsystem $12_2$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present disclosure is not limited to any one particular driveline subsystem.

In any event, in one embodiment, one or more of subsystems 12 may be under at least a certain degree of control by VCU 14. In such an embodiment, those subsystems 12 are electrically coupled to, and configured for communication with, VCU 14 to provide feedback to VCU 14 relating to operational or operating parameters of the vehicle, as well as to receive instructions or commands from VCU 14. Taking the powertrain subsystem $12_1$ as an example, powertrain subsystem $12_1$ may be configured to gather various types of information relating to certain operating parameters thereof, such as, for example, torque output, engine or motor speed, mode of operation, etc., and to then communicate that information to VCU 14. This information may be gathered from, for example, one or more of vehicle sensors. Powertrain subsystem $12_1$ may also receive commands from VCU 14 to adjust certain operating parameters when, for example, a change in conditions dictates such a change (e.g., when a change in vehicle speed has been requested via a brake pedal or accelerator pedal of vehicle 10). While the description above has been with particular reference to powertrain subsystem $12_1$, it will be appreciated that the same principle applies to each such other subsystem 12 that is configured to exchange information/commands with VCU 14.

Each subsystem 12 may be configured to receive and execute instructions or commands provided by VCU 14, and/or to perform or control certain functionality independent from VCU 14. Alternatively, two or more subsystems 12 may share a single VCU 14 and can be directly controlled by the VCU 14 itself. In an embodiment wherein a subsystem 12 communicates with VCU 14 and/or other subsystems 12, such communication may be facilitated via any suitable connection, such as, for example, a controller area network (CAN) bus, a system management bus (SMBus), a proprietary communication link, or through some other arrangement known in the art. It can be appreciated that each of the elements shown in FIG. 1 can be electrically and/or communicatively connected to the VCU 14 via the CAN bus or some other suitable connection discussed above. For instance, the VCU 14 can include a communication input for receiving an indicator or signal that alerts the VCU 14 of a change between two-wheel-drive driveline operation and four-wheel-drive driveline operation. In one implementation, the transfer case 220 can initiate an electronic message that can be received by the VCU 14 each time the vehicle 10 changes between two and four-wheel-drive operating modes. Or an ECU responsible for the powertrain subsystem $12_2$ (not shown) can transmit an instruction to the VCU 14 each time the vehicle 10 changes between two and four-wheel-drive operating modes. The VCU 14 can also direct the transfer case 220 to change between two and four-wheel-drive operating modes independent from driver or operator input. For example, the VCU 14 can receive data from one or more vehicle sensors (discussed below) and based on that data determine that tyre slippage exists. When tyre slippage is detected, the VCU 14 can command the transfer case 220 to change operating modes. Other implementations are possible.

It will be appreciated that the foregoing represents only some of the possibilities with respect to the particular subsystems of vehicle 10 that may be included, as well as the arrangement of those subsystems with VCU 14. Accordingly, it will be further appreciated that embodiments of vehicle 10 including other or additional subsystems and subsystem/VCU arrangements remain within the spirit and scope of the present disclosure.

The subsystems 12 discussed above can use one or more sensors to gather data about the vehicle 10. These sensors may be embodied in hardware, software, firmware, or some combination thereof. Sensors may directly sense or measure the conditions for which they are provided, or they may indirectly evaluate such conditions based on information provided by other sensors, components, devices, modules, systems, etc. Further, these sensors may be directly coupled to VCU 14 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. It should be appreciated that the foregoing scenarios represent only some of the possibilities, as vehicle 10 is not limited to any particular arrangement(s), but rather any suitable embodiment may be used.

VCU 14 may comprise any suitable dedicated electronic control unit (ECU) 16 or microprocessor as well as any variety of other electronic processing devices, memory devices, input/output (I/O) devices, and/or other known components, and perform various control and/or communication related functions. In one embodiment, VCU 14 includes a non-transient computer-readable medium, such as an electronic memory device 18, that may store various sensor readings (e.g., such as those generated by vehicle sensors), look-up tables or other data structures, algorithms (e.g., the algorithms embodied in the method described below), etc. Memory device 18 may also store pertinent characteristics and background information pertaining to vehicle 10 and subsystems 12. The ECU 16 included with the VCU 14 can be implemented as an electronic processing device (e.g., a microprocessor, a microcontroller, an application specific integrated circuit (ASIC), etc.) that executes instructions for software, firmware, programs, algorithms, scripts, applications, etc. that are stored in memory device 18 and may govern the methods described herein. As described above, VCU 14 may be electronically connected to other vehicle devices, modules, subsystems, and components (e.g., sensors) via suitable vehicle communications and can interact with them when required. These are, of course, only some of the possible arrangements, functions, and capabilities of VCU 14, as other embodiments could also be used. Depending on the particular embodiment, VCU 14 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 14 is not limited to any one particular embodiment or arrangement.

The VCU 14 can be electronically and/or communicatively connected to another vehicle subsystem—a power-assisted steering (PAS) system $12_3$. The vehicle 10 uses the PAS system $12_3$ to decrease the effort to operate a steering wheel 20 of the vehicle 10 relative to operating the steering wheel 20 without assistance. The PAS system $12_3$ of the vehicle 10 can be implemented using a hydraulic system, an electrical system, or some hybrid of hydraulic and electrical systems (sometimes called electro-hydraulic) as is known in the art. An electrical implementation of the PAS system $12_3$ is shown in FIG. 2. The electrical implementation can include a rack and pinion gear 30, a steering angle sensor 32, and a torque sensor 34. The rack and pinion gear 30 is coupled to an electric motor 36 that provides torque to the rack of the rack and pinion gear 30 at the direction of the VCU 14. A driver can rotate the steering wheel 20 and the steering angle sensor 32 can detect the steering wheel position while the torque sensor 34 can detect the amount of torque the driver applies to the steering wheel 20. The steering angle sensor 32 and the torque sensor 34 can provide data reflecting the motion of the steering wheel 20 to the VCU 14, which then uses that data to determine how much force or assistance the motor 36 should provide to the rack and pinion gear 30. The VCU 14 can also be electrically connected to a speed sensor 38 that detects the speed of the vehicle and communicates data reflecting the speed of the vehicle 10 to the VCU 14.

It should be appreciated that the systems and methods described herein can be used with other types of power-assisted-steering systems and also that other implementations of electrical power-assisted-steering systems can be used other than the one shown in FIG. 2. The PAS system $12_3$ can also be implemented as a hydraulic system. Hydraulic PAS systems commonly include a rotary pump that supplies hydraulic fluid under pressure via a valve to a steering rack. These elements can be implemented in various ways. For example, the rotary pump can be powered by the powertrain subsystem $12_1$. But in another implementation the rotary pump can be powered by a separate electric motor. And pressure applied to the steering rack can be regulated in various ways. In one implementation, the VCU 14 can regulate the assistance the hydraulic PAS system $12_3$ provides by controlling the valve supplying hydraulic fluid from the rotary pump to the steering rack. In another implementation, the VCU 14 can regulate the speed of the separate electric motor powering the rotary pump. As one skilled in the art will appreciate, the PAS system $12_3$ can be implemented in a variety of different configurations.

Figure 3:
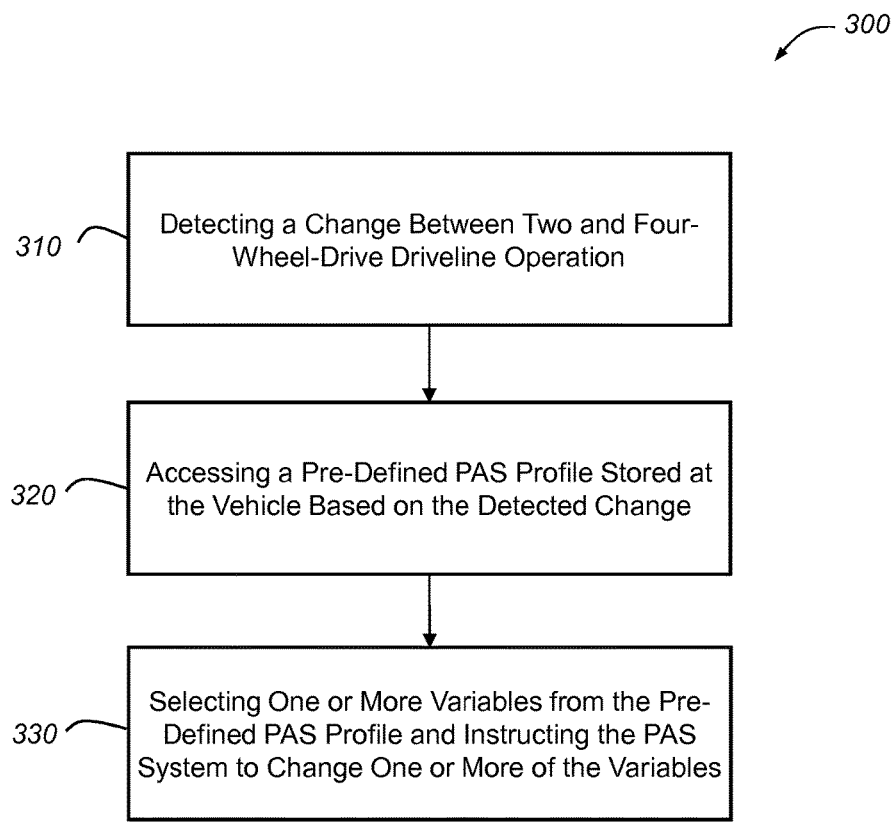
FIG. 3 is a flow chart of a method of controlling a configuration of a vehicle power-assisted-steering (PAS) system.

Turning to FIG. 3, an implementation of a method 300 of controlling a configuration of the vehicle power-assisted-steering (PAS) system $12_3$ is shown. The method 300 begins at step 310 by detecting at the vehicle 10 a change between two-wheel-drive driveline operation and four-wheel-drive driveline operation. As discussed above, VCU 14 can receive an electronic message that alerts it of a change between two and four-wheel drive modes of operation. Or the VCU 14 can direct the transfer case 220 to change between two and four-wheel drive modes of operation. It should be appreciated that the detection of the change between two-wheel-drive driveline operation and four-wheel-drive driveline operation can involve detecting an actual mechanical change at the powertrain subsystem $12_2$ whereby the VCU 14 receives an electronic message when the transfer case 220 of the vehicle 10 begins or ends operation in either two or four-wheel-drive driveline operation. In one example, the transfer case 220 can initiate an electronic message that can be received by the VCU 14 each time the vehicle 10 changes between two and four-wheel-drive operating modes. Or an ECU responsible for the powertrain subsystem $12_2$ can transmit an instruction to the VCU 14 each time the vehicle 10 changes between two and four-wheel-drive operating modes. However, it should also be appreciated that detection of the change can also be carried out by receiving an electronic message indicating that a driver has selected a change between two and four-wheel-drive driveline operation (i.e., before the powertrain subsystem 12₂ and/or transfer case 220 has actually changed its mode of driveline operation). In this implementation, the VCU 14 can receive a signal in response to the driver selecting a two or four-wheel-drive mode of driveline operation. Detection of the change can also occur when the VCU 14 determines that tyre slippage exists or has ended and directs the transfer case 220 to change between two and four-wheel-drive operating modes. The method 300 proceeds to step 320.

At step 320, a pre-defined PAS profile stored at the vehicle 10 is accessed based on the detected change between two and four-wheel-drive modes of operation. Pre-defined PAS profiles include pre-set variables for controlling and/or configuring the PAS system 12₃. In one embodiment, the vehicle 10 can store a four-wheel-drive PAS profile and a two-wheel-drive profile in the electronic memory device 18 of the VCU 14. Each of these PAS profiles can include one or more of the following variables: a level or amount of assistance that the PAS system 12₃ provides, a level or amount of damping the PAS system 12₃ provides, and/or a level or amount of assistance the PAS system 12₃ provides to return the vehicle steering wheel 20 to its center position. For example, the amount of assistance the PAS system 12₃ provides may be higher in the four-wheel drive PAS profile relative to the two-wheel-drive profile. And the pre-defined PAS profiles for two and four-wheel-drive may solely account for differing levels of assistance. However, it is also possible to further refine the pre-defined PAS profiles by not only including levels of assistance but also the amount of damping and/or the amount of assistance returning the steering wheel 20 back to its center position. That is, the four-wheel-drive PAS profile could include not only a greater amount of assistance but it could also specify more damping than the two-wheel-drive PAS profile. Other combinations of variables are possible. The pre-defined PAS profiles can be accessed by the VCU 14 in response to a change between two and four-wheel-drive operating modes. When the VCU 14 determines that the vehicle 10 has begun operating in four-wheel-drive, the VCU 14 can be instructed to access the four-wheel-drive PAS profile in response to this determination.

In another embodiment, the pre-defined PAS profiles can be further refined based on vehicle speed. For example, using the two and four-wheel-drive PAS profiles described above, each of these PAS profiles can include different baskets of pre-set variables based on the speed of the vehicle 10. In one implementation, the two-wheel-drive PAS profile and the four-wheel-drive PAS profile each includes four baskets of variables each having values that can be used for a range of vehicle speeds. The two-wheel-drive PAS profile can use a first basket of variables and values associated with those variables between 0-20 kilometers per hour (Kph), a second basket between 20-40 Kph, a third basket between 40-70 Kph, and a fourth basket between 70-110 Kph. The four-wheel-drive PAS profile can use a first basket of variables and values associated with those variables between 0-30 Kph, a second basket between 30-50 Kph, a third basket between 50-80 Kph, and a fourth basket between 80-120 Kph. The basket of variables can be any combination of the variables discussed above. Depending on whether the vehicle 10 is operating in two or four-wheel-drive, as speed changes so can the values assigned to the variables of the pre-defined PAS profile as applied to the PAS system 12₃. A plurality of baskets can be saved with each pre-defined profile. When the VCU 14 determines that the vehicle 10 has changed speed such that a different basket of variables should be used from the pre-defined PAS profile, the VCU 14 can access the different basket of variables. The method 300 proceeds to step 330.

At step 330, one or more variables are selected to apply to the PAS system 12₃ from the pre-defined PAS profile and the PAS system 12₃ is instructed to change one or more of the selected variables and apply data associated with the selected variable(s) stored in the PAS profile. When the VCU 14 receives a message indicating that the vehicle 10 has begun operating in two or four-wheel-drive mode, the VCU 14 can access the appropriate pre-defined PAS profile and retrieve one or more values associated with the variables included in the profile in the form of data and control the PAS system 12₃ using those values. For example, when the VCU 14 receives a message that the vehicle 10 has stopped operating in two-wheel-drive mode and begun operating in four-wheel-drive mode, the VCU 14 can then access the four-wheel-drive PAS profile, read the data representing the values associated with the variables in the four-wheel-drive PAS profile, and control the PAS system 12₃ using that data. Using the PAS system 12₃ shown in FIG. 2 for explanation, the VCU 14 can direct the motor 36 to provide more assistance to the rack and pinion 30 than it did when the vehicle 10 operated in two-wheel-drive mode. And a similar action can occur when the VCU 14 detects that the vehicle has stopped operating in four-wheel-drive mode and begun operating in two-wheel-drive mode. The VCU 14 can then access the two-wheel-drive PAS profile, read the data representing the values associated with the variables in the two-wheel-drive PAS profile, and control the PAS system 12₃ by directing the motor 36 to provide less assistance to the rack and pinion 30 than it did when the vehicle 10 operated in four-wheel-drive mode. The data included in both the two-wheel-drive PAS profile and the four-wheel-drive PAS profile can be gathered empirically or calculated and included in a look-up table for electronic access. The result of these actions can provide a more uniform level of driver effort regardless of whether the vehicle 10 is operating in two or four-wheel-drive mode. Put differently, the difference in effort, dampening, or return specified in the two-wheel-drive PAS profile and the four-wheel-drive PAS profile can be set to values that would compensate for the change in feedback to the steering wheel caused by a change between operation in two-wheel-drive mode and four-wheel-drive mode. The method 300 then ends.

Figure 4:
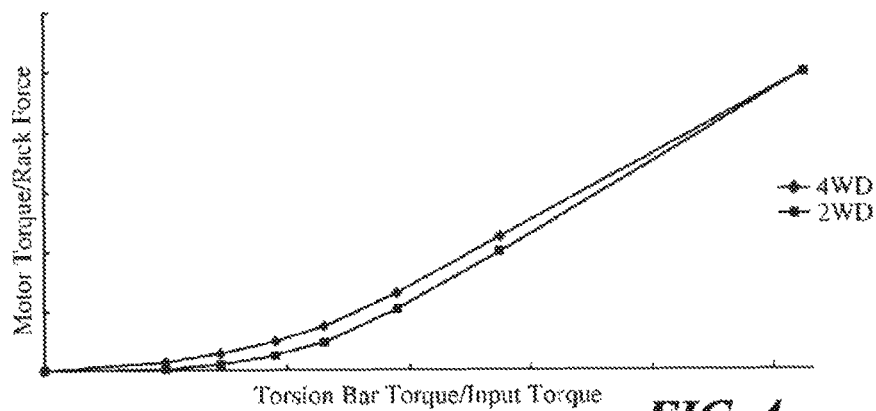
FIGS. 4-9 depict a number of possible relationships are shown between two-wheel-drive PAS profiles and four-wheel-drive PAS profiles.
Figure 5:
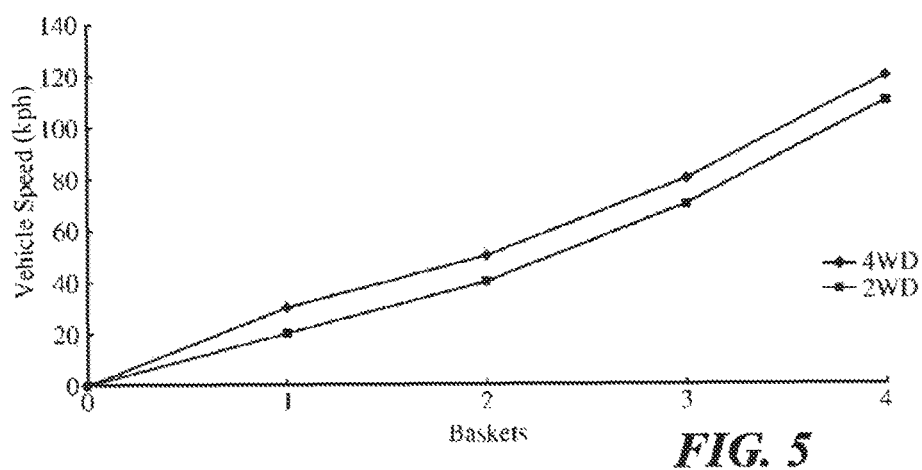
Figure 6:
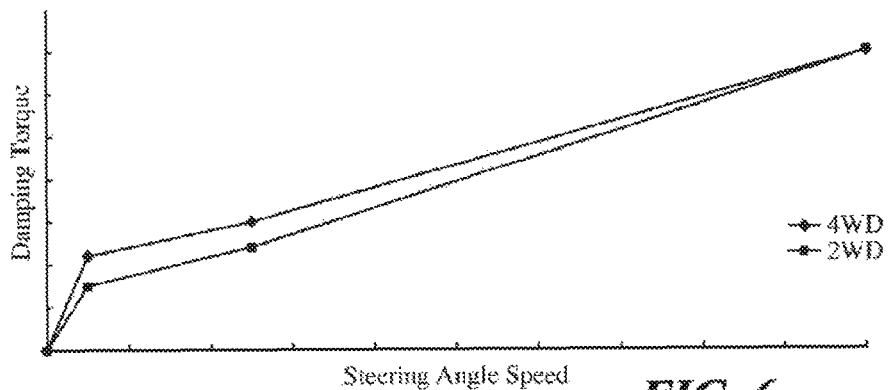
Figure 7:
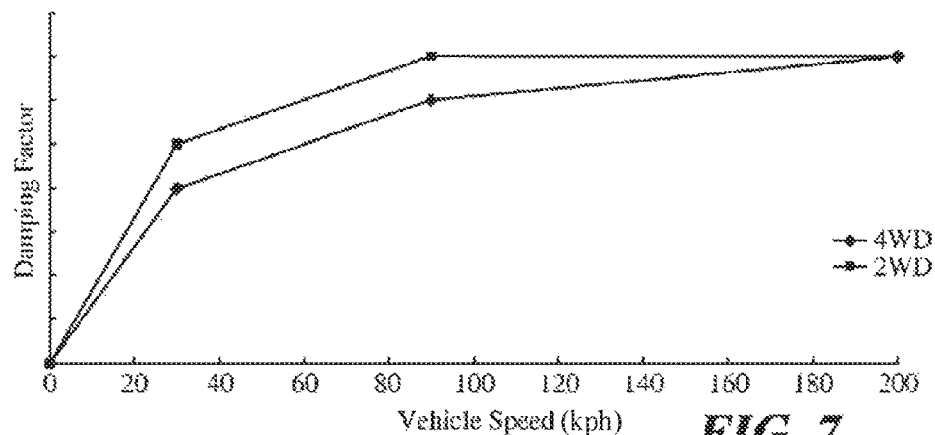
Figure 8:
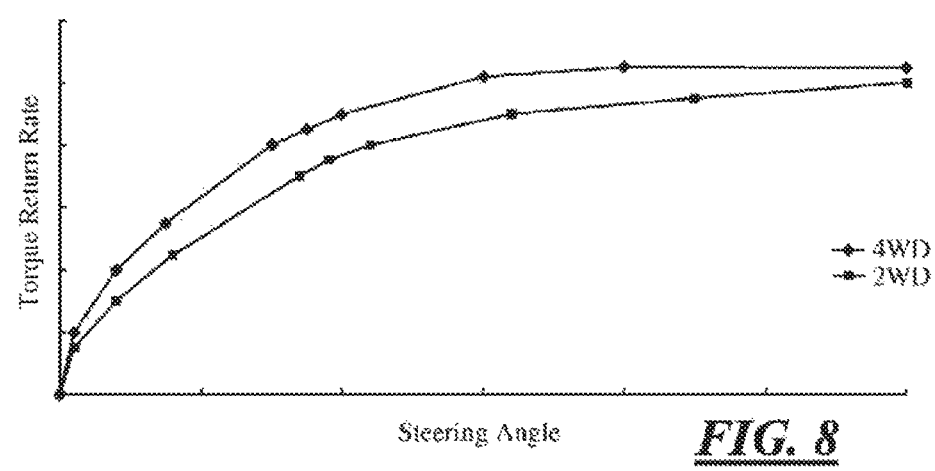
Figure 9:
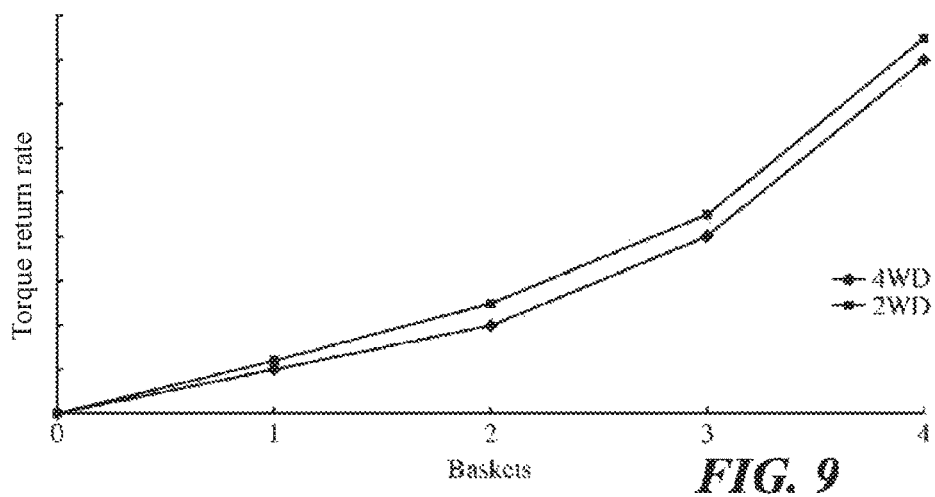

Turning to FIGS. 4-9, a number of possible relationships are shown between two-wheel-drive PAS profiles and four-wheel-drive PAS profiles. In FIG. 4, the amount of torque provided by the motor 36 to the rack and pinion 30 is shown relative to the amount of input torque applied to the steering wheel 20 for both two-wheel-drive PAS profiles and four-wheel-drive PAS profiles. FIG. 5 depicts the amount of vehicle speed for each basket of variables used with two-wheel-drive PAS profiles and four-wheel-drive PAS profiles. In FIG. 6, the amount of damping torque is shown resulting from increasing amounts of steering angle speed in both two-wheel-drive PAS profiles and four-wheel-drive PAS profiles. FIG. 7 illustrates a damping factor or variables applied as vehicle speed increases in both two-wheel-drive PAS profiles and four-wheel-drive PAS profiles. FIG. 8 depicts an amount of assistance returning the steering wheel 20 to its center position (i.e., the target rate of return) at increasing amounts of steering angle. And FIG. 9 shows an amount of assistance returning the steering wheel 20 to its center position at different amounts of vehicle speed for each basket of variables used with two-wheel-drive PAS profiles and four-wheel-drive PAS profiles.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method implemented by a vehicle control unit, the method of controlling a configuration of a vehicle power-assisted-steering (PAS) system, comprising:
    (a) detecting a change between two-wheel-drive driveline operation and four-wheel-drive driveline operation at the vehicle control unit in a vehicle;
    (b) accessing a pre-defined PAS profile stored at the vehicle based on the detected change, wherein the pre-defined PAS profile comprises at least two of the following three variables: a level of PAS assist, a level of PAS damping, and a level of steering wheel return to a steering wheel center position, the variables included in a plurality of baskets, each basket comprising at least one of the variables;
    (c) applying different variables from the baskets based on a speed of the vehicle, such that the variable(s) from a first basket are applied to the PAS system from the pre-defined PAS profile at a first vehicle speed, and the variable(s) from a second basket are applied to the PAS system from the pre-defined PAS profile in response to a change in vehicle speed; and
    (d) instructing the PAS system to use one of the applied variables and apply data associated with the one of the applied variables stored in the pre-defined PAS profile.

2. The method of claim 1, comprising:
sending a message from a driveline subsystem to the vehicle control unit.

3. The method according to claim 1, wherein the pre-defined PAS profile comprises:
a two-wheel-drive PAS profile or a four-wheel-drive PAS profile.

4. The method according to claim 1, wherein the vehicle PAS system is an electrical PAS system.

5. The method according to claim 1, wherein the vehicle PAS system is a hydraulic PAS system.

6. The method of claim 5, wherein the vehicle PAS system includes an electric motor to power a rotary pump.

7. A vehicle power-assisted steering (PAS) system controller, comprising:
    an electronic vehicle control unit (VCU) that includes a processor, a non-transient computer-readable medium for storing data, and a communication input for receiving an indicator that alerts the VCU of a change between two-wheel-drive driveline operation and four-wheel-drive driveline operation, wherein the VCU:
    detects a change between two-wheel-drive driveline operation and four-wheel-drive driveline operation using the communication input;
    accesses a pre-defined PAS profile stored in the non-transient computer-readable medium based on the detected change, wherein the pre-defined PAS profile comprises at least two of the following three variables: a level of PAS assist, a level of PAS damping, and a level of steering wheel return to a steering wheel center position, the variables included in a plurality of baskets, each basket comprising at least one of the variables;
    commands a vehicle PAS system to apply different variables from the baskets based on a speed of the vehicle, such that the variable(s) from a first basket are applied at a first vehicle speed, and the variable(s) from a second basket are applied in response to a change in vehicle speed; and
    uses one of the applied variables and applies data associated with the one of the applied variables stored in the pre-defined PAS profile.

8. A vehicle comprising a system controller according to claim 7.

* * * * *